Aug. 4, 1942.   E. I. KELSEY   2,291,727
POCKETKNIFE
Filed July 1, 1939
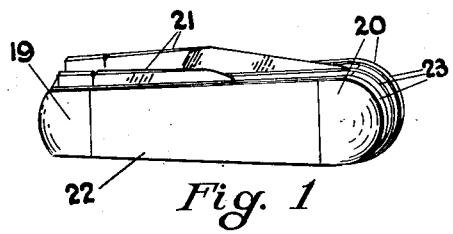
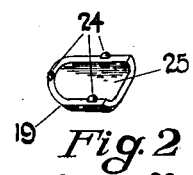
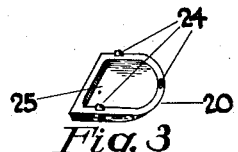
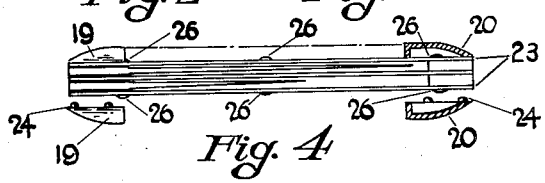
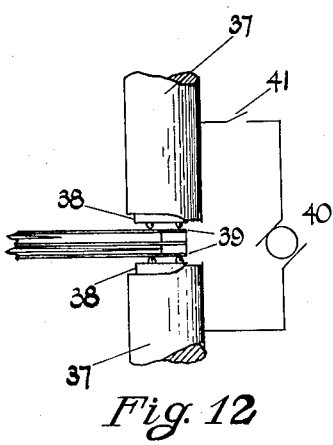
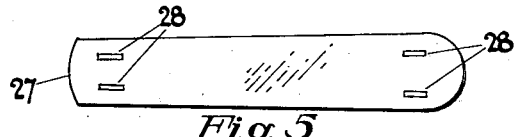
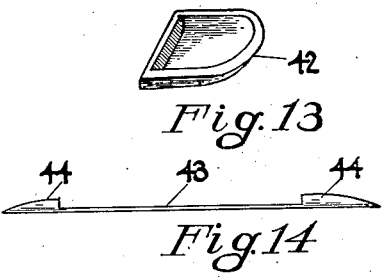
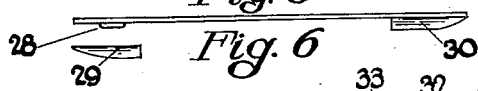
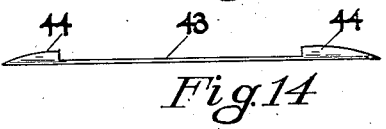
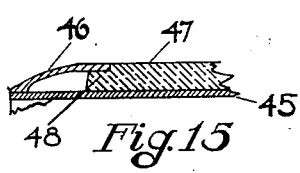
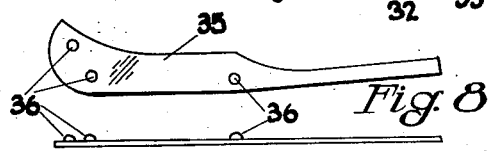
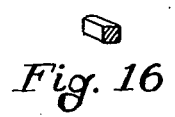
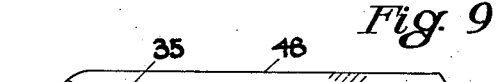
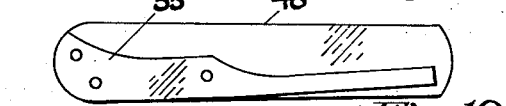
INVENTOR.
ELIAS I. KELSEY
BY
D. Verner Smythe
ATTORNEYS.

Patented Aug. 4, 1942

2,291,727

UNITED STATES PATENT OFFICE 2,291,727

POCKETKNIFE

Elias I. Kelsey, Milford, Conn., assignor to Remington Arms Company, Inc., a corporation of Delaware Application July 1, 1939, Serial No. 282,539

6 Claims. (Cl. 30—164)

The invention relates to a simplified means and method of construction of the conventional pocket knife by the use of projection welding for fastening the component parts together in their assembly. In projection welding, a projection of relatively small cross sectional area is made in some suitable manner on one or both of the objects to be welded and the projection is placed into contact with the surface or corresponding projection of the object to which it is to be joined. Electrodes connected to a suitable source of electric current are then placed against the objects. The reduced area of the projection will cause high resistance at that point, which will raise the same to welding temperature, causing a fusion of the two objects. The joining may also be done in other ways as will appear in the disclosure following.

In the drawing:

Fig. 1 shows a perspective view of a conventional pocket knife.

Figs. 2 and 3 are perspective views of the bolsters showing the projections on the surfaces to be placed against the knife body.

Fig. 4 is a plan view of a knife with the bolsters at one end in section and the bolsters on the one side separated from the knife.

Fig. 5 is a scale showing a modification of the invention.

Fig. 6 is a side view of the scale of Fig. 5 with the bolster at one end attached thereto and the bolster at the other end separated therefrom.

Fig. 7 is a plan view partially in section of one end of the knife showing another modification wherein the boltsers are welded to the knife pin.

Fig. 8 is a side view of a knife spring embodying the invention.

Fig. 9 is a plan view of Fig. 8.

Fig. 10 is a side view of a knife spring assembled to a scale.

Fig. 11 is a plan view of a knife scale and two springs ready to be welded.

Fig. 12 is a schematic view of the knife elements in position between two electrodes ready to be welded.

Fig. 13 is a perspective view of a modified form of the bolster.

Fig. 14 is a modification showing a bolster plate with raised end bolsters.

Fig. 15 is a detail of a means of fastening the handle to the knife.

Fig. 16 shows a cross section of another form of spring.

A conventional pocket knife is shown in Fig. 1, having bolster end pieces 19 and 20, blades 21, handles 22, scales 23, and the usual springs between the scales. It is to be understood that a knife with any combination of blades may be used such as, for example, one blade at each end, two blades at one end, two blades at each end, and any other combination.

Figs. 2 and 3 disclose the bolster end pieces removed from the side of the knife, looking into the inside face of said bolsters. In one form of the invention, as shown in Figs. 2 and 3, projections 24 are formed on the inside edge of the bolsters, the interior of the bolsters 19 and 20 being hollow or relieved as at 25. The scales 23, together with the blades 21, may be assembled in a conventional manner with rivets or knife pins 26 holding the same together. The bolster end pieces 19 and 20 are placed against the scales 23 and a suitable electric current is passed through the bolster and the scale. The path of this current is through a scale 23, the projection 24 and the bolsters 19 or 20. As the projections 24 are of small cross sectional area, the resistance will be high and sufficient heat will be generated at this point to cause the welding of the bolsters to the scales.

In Fig. 4, the bolsters 19 and 20 at the lower half of the knife are shown separated therefrom, ready to be placed in position against the scale 23. The bolsters 19 and 20 at the upper part of the knife are shown in position after having been welded to the scale 23 as just described. The scales 23 may have the bolsters 19 and 20 welded thereto previous to their assembly with the remaining parts of the knife. However, in such a construction, the end rivet or knife pins must clear the bolsters or pass therethrough.

The scale may also take the form shown in Figs. 5 and 6, as at 27, in which projections 28 are struck up from the plane of the scale. The bolsters 29 and 30 in this form are flat across the inside face or are so made that they will contact the projections 28. The bolsters are then held against said projections and a suitable current passed therethrough. The projections, being of small cross sectional area, will give the resistance necessary to create the heat required for welding. In Fig. 6, the bolster 29 is shown separated from the scale ready to be placed in position, and the bolster 30 is shown in position after having been welded to the scale.

It is to be understood that, if desired, both parts may have projections which cooperate with each other and through which the current passes. As for example, the bolsters may have projections corresponding to the projections 28 of the scale 27.

The bolsters may also be welded to the knife scale assembly as shown in Fig. 7, wherein the scales 23 have been assembled by means of the knife pin 31 in the usual manner. The protruding ends 32 of the pin 31 are made such as to contact the interior surface of the bolsters 33 which are similar in appearance to that shown in Fig. 13, the interior being made to have such a clearance as to contact the protruding end of pin 31. If desired, a washer 34 may be used under the riveted head of the pin 31 so as to insure the proper spacing, although this washer is not necessary. The hollow bolster pieces 33 may then be put into position on the knife and a suitable current passed through the bolster pieces, the rivet pin, and the knife parts, the reduced contact area of the pin with the bolster plate serving to create sufficient resistance to heat and weld the parts together. It may be seen that the interior contour of the bolster may differ from that shown and that it may surround the rivet pin as closely as desired.

The knife springs may also be welded to the scales in the knife assembly instead of using the conventional knife pins. In such instance, the spring 35 may have projections 36 struck from the plane thereof at the desired points of contact with the knife scale, such as, for example, in the single ended knife at two points, namely at the middle and at the end opposite to that at which the blade is pivoted. In the case of a double ended knife, the knife spring would be welded only in the center.

A spring 35 is placed against the scale 48 (Fig. 10) and electrodes of the suitable welding circuit held against the spring and the scale. The resistance caused by the small projections 36 upon the passage of suitable current will weld the spring to the scale at those points. When this occurs, however, the heat generated at the points of the projections where they are welded to the scale is sufficient to cause recrystallization of the spring in the immediate vicinity of the weld, which destroys the value of the spring and makes it brittle at this point. It therefore becomes necessary to properly heat treat the assembly before it may be used.

In the heat treating operation, the scale and spring are placed in a suitable oven or heating means and raised to the proper temperature and then, in any of the usual manners, treated to restore the spring to its correct condition and give to it the proper spring characteristics. It is evident that the condition of the scale will be immaterial and the heat treating operation may be carried on without regard to the effect thereon. It is also apparent that the spring may be brazed to the scale, using a suitable brazing metal and flux between the parts and applying an electrical current in a manner similar to the welding operation just described.

In Fig. 11 there is shown a scale 48 having springs 35 placed in position against the same ready for welding. The electrodes may then be placed on the outside of each spring and a suitable current passed therethrough which will cause the two springs to be welded substantially simultaneously to the scale in the same operation.

It is also possible to weld two bolsters to a scale assembly in a similar manner in the same operation, and such is shown diagrammatically in Fig. 12, wherein the electrodes 37 may be shaped to hold the bolsters 38 in position against the scale assembly 39, the scale assembly 39 having had the springs and knife blades assembled thereto previously. The parts may also be welded in various series combinations such as, for example, causing the current to flow from one end bolster through the scale to the bolster on the opposite end of the knife. A suitable source of current 40 is connected to the electrodes 37 through a switch 41 which, upon closure, will supply suitable current to weld the bolsters to the scale assembly. It can be seen that the springs, scales and bolster end pieces may be suitably held between the electrodes and the entire welding operation done at one time. The bolsters may also take the form of that shown in Fig. 13, having a thin edge 42 which is placed in contact with the scales, the thin edge being substituted for the projection. When this is done, the current passing through the bolster and the thin edge to the scale will give sufficient resistance to create the heat necessary for the welding operation. The scales may be of any suitable metal, steel or brass usually being used, and the bolsters may likewise be of any suitable metal such as steel, brass, zinc or nickel silver, these metals merely being given as examples and it not being necessary that the bolster, scale or spring be of the same material. The bolster plates can be die-cast, swaged, stamped, or made in any desirable manner.

By the use of projection welding as disclosed, a flat spring wire of the cross section, for example as shown in Fig. 16, may be substituted for the spring of the shape shown in 35, the difficulty previously having been in the drilling of pin holes through the flat spring wire. In the event that this type of a spring is used, the spring can be suitably bent before or after it is in position on the knife scale. It can be seen that this allows the use of a stock material that is easily obtainable. In the event that such a spring is used, a suitable closure member (not shown) may be placed between the scales of the knife, if desired, to enclose the flat spring wire and improve the appearance of the knife.

Instead of there being four bolsters for a knife as seen in Figs. 1 to 4, for example, a one-piece stamped bolster plate 43 as shown in Fig. 14 may be used, having raised end portions 44 assimilating the bolster end pieces. The bolster plate 43 may then be welded directly to the knife assembly.

It is also possible to weld a one-piece bolster plate, such as seen in Fig. 14, directly to the assembly of a center scale and springs such as in Fig. 11, eliminating the necessity of using separate outside scales, or weld the one-piece bolster plates directly to the springs and pins of a knife not having a center scale. The one-piece bolster plate may have a handle directly attached thereto. It is thus evident that similar to the form shown in Fig. 7, a one-piece bolster plate may be directly fastened to the knife pins thereby doing away with the outside scales.

The bolster end pieces may also be made so that a protruding portion 48 of the cover 47 will extend thereunder, locking a cover plate or handle in place. In Fig. 15, there is a scale 45 with a bolster 46 welded thereto in the manner disclosed previously, having a handle of any suitable material 47, such as a plastic, placed in position on the scale. It can be seen that the handle 47 may be assembled and held in place by the welding operation of the bolster to the scale.

It is seen therefore that the invention provides a simplified way in which to construct pocket knives. By welding the bolsters or bolster plates to the scales of the knife assembly it is possible to cover up the ends of the knife pins, thereby improving the appearance of the knife and also eliminating the necessity of finishing the protruding ends thereof. Knife assemblies of desired configurations and combinations can be made up in standard forms and then the selected handles and bolsters welded thereto. The method lends itself particularly to production methods wherein the knives may be placed in suitable holders in a welding machine and welded in succession.

It is also possible to assemble the component parts in a locating fixture and weld all of the parts at the same operation in a series weld.

The welding of the springs to the scales eliminates the difficulties involved in placing the knife pins in position and also makes possible the use of drawn wires of stock shapes that could not be successfully used previously.

It is evident that any of the decorative or additional holding elements used on the handle of the knife may be attached by projection welding.

As the invention is believed to be the first to provide a satisfactory welded pocket knife and method of producing the same, it is not limited to the details shown herein, described in the drawing and illustrated, but is to be construed as covering all equivalent devices falling within the scope of the appended claims.

What is claimed is:

1. In the manufacture of pocket knives having bolsters and a scale assembly, the method comprising the steps of providing projections having relatively small cross sectional areas on the bolsters, placing the bolsters in position on the scale assembly with the bolster projections in engagement therewith, and welding the bolsters to the scale assembly by placing the bolsters and scale assembly between electrodes shaped to seat the bolsters and passing a suitable electric current through all of the parts and projections whereby the component parts are welded together.

2. In the manufacture of pocket knives having substantially hollow bolsters and a scale assembly with projecting knife pins, said pins projecting sufficiently to be adapted to engage the interior of the hollow bolsters, the method comprising the steps of placing the hollow bolsters at the ends of the scale assembly with the pins in contact with the interior thereof, passing a suitable electric current through the bolsters and the pins to weld the bolsters in place.

3. In the manufacture of pocket knives having blades and springs assembled on knife pins and bolster plates, the method comprising the steps of placing the bolster plates in contact with the knife pins and passing a suitable electric current through the bolster plates and the pins to weld the bolster plates in place.

4. In the assembly of pocket knives having handles, metallic bolsters and metallic scales, the method comprising the steps of providing projections having a small cross sectional area on the metallic parts; placing a handle on the scale; placing the bolsters on the scale with the projections in proximity to the scale, the bolsters overlying the ends of the handle; passing a suitable electric current through the scale, projections and bolsters, thereby welding the bolsters to the scale, the overlying portions of the bolsters over the handle serving to hold the handle permanently in place.

5. In a pocket knife, a scale assembly having projecting knife pins, substantially hollow bolster end plates, the pins contacting the interior of the bolster plates, an area of fused metal of the bolster and pin between the bolster plate and the pin.

6. In a pocket knife, the combination comprising blades and springs assembled on knife pins, one-piece metallic bolster plates, an area of fused metal of the bolster plate and pin between the bolster plates and the pins.

ELIAS I. KELSEY.